United States Patent

[11] 3,572,037

[72] Inventor Goerge C. Sorensen
589 S.E. 4th St., Ontario, Oreg. 97914
[21] Appl. No. 825,131
[22] Filed May 12, 1969
[45] Patented Mar. 23, 1971
Continuation-in-part of application Ser. No. 800,200, Feb. 18, 1969.

[54] EXTERNAL COMBUSTION ENGINE
2 Claims, 16 Drawing Figs.

[52] U.S. Cl. .................................... 60/108, 415/91
[51] Int. Cl. ..................................... F01d 1/02, F22b 27/08
[50] Field of Search ........................................ 415/91, 74; 60/108, 40, 39.34, 39.35, 39.36

[56] References Cited
UNITED STATES PATENTS

| | | | |
|---|---|---|---|
| 844,824 | 2/1907 | Martin | 415/91 |
| 863,524 | 8/1907 | Flatau | 415/91 |
| 1,297,263 | 3/1919 | Simms | 60/27X |
| 2,867,975 | 1/1959 | Mallory | 60/27 |
| 3,143,850 | 8/1964 | Foster | 60/27X |
| 3,192,705 | 7/1965 | Miller | 60/27 |

FOREIGN PATENTS

| | | | |
|---|---|---|---|
| 339,962 | 6/1904 | France | 415/91 |

*Primary Examiner*—Martin P. Schwadron
*Assistant Examiner*—Robert R. Bunevich
*Attorneys*—David V. Trask, C. Harvey Gold and William S. Britt ABSTRACT: An external combustion engine is constructed with a rotatable housing having compression and expansion chambers and a stator mounted within the expansion chamber. The stator is provide with a helical crest, and the expansion chamber, an internal lining adapted to oppose cyclonic flow created by the crest. The inlet to the compression chamber is venturi in effect so that steam introduced directly to the chamber can draw other gases, such as combustion gases, into the chamber as well. Such gases may be relied upon to superheat the steam within the compression chamber.

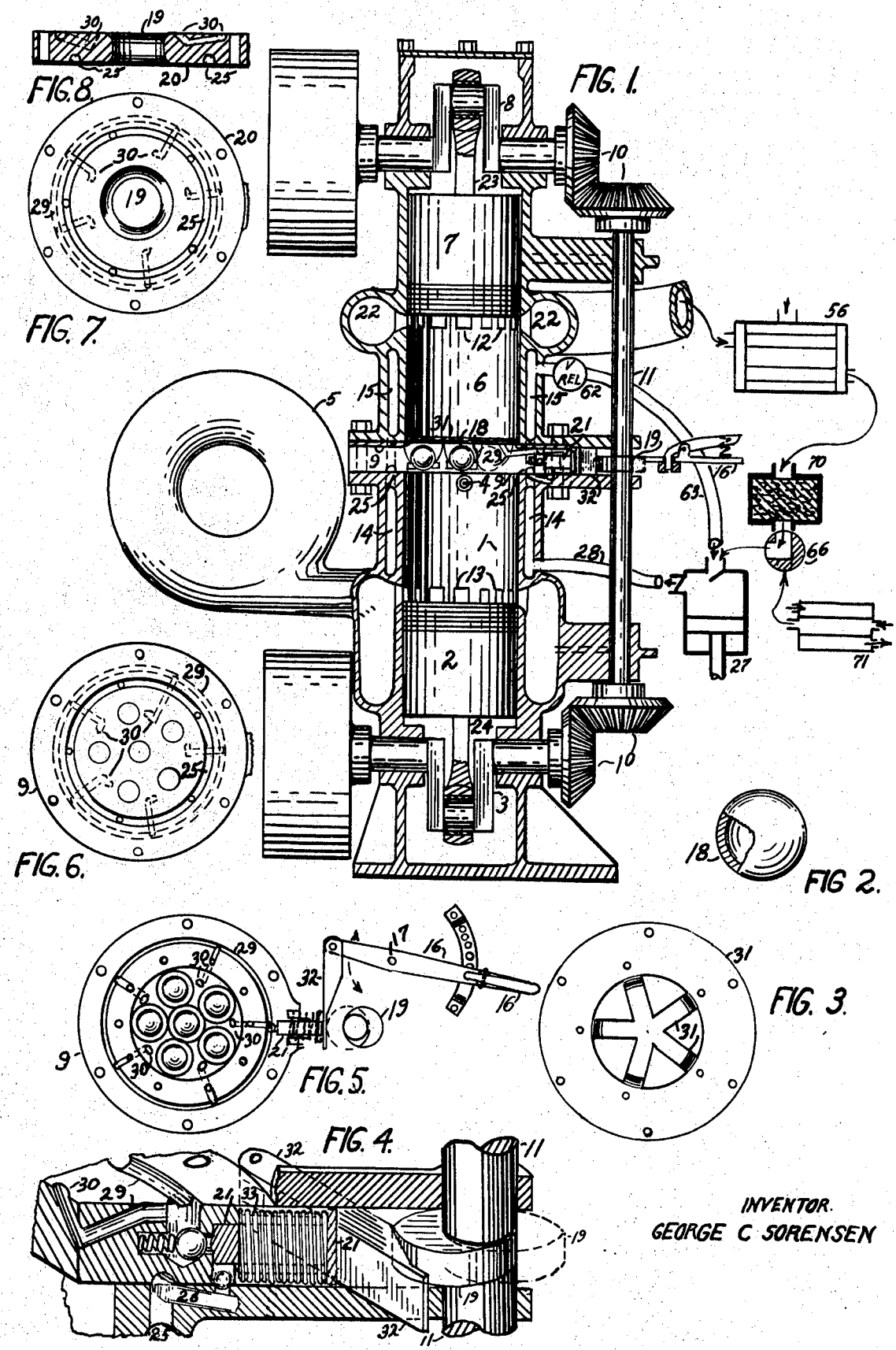

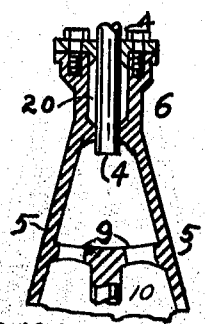
FIG. 10A
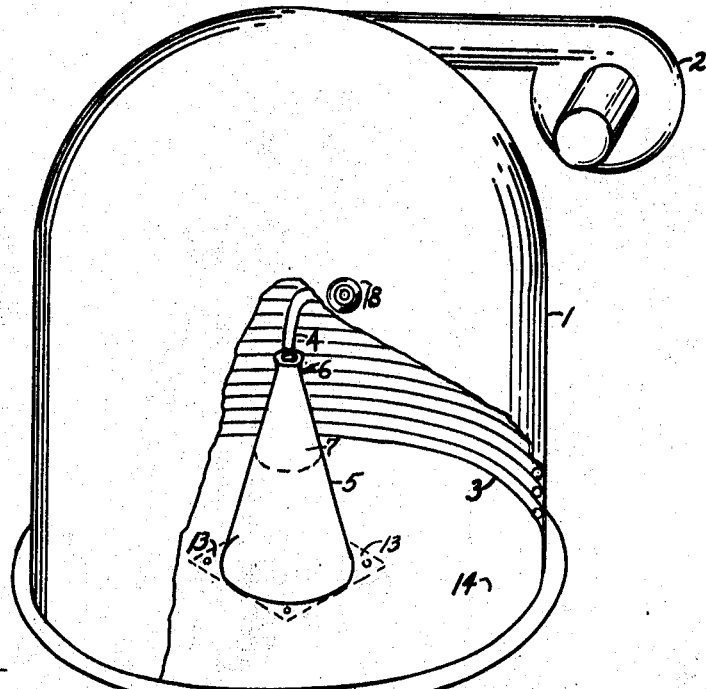
FIG. 9.
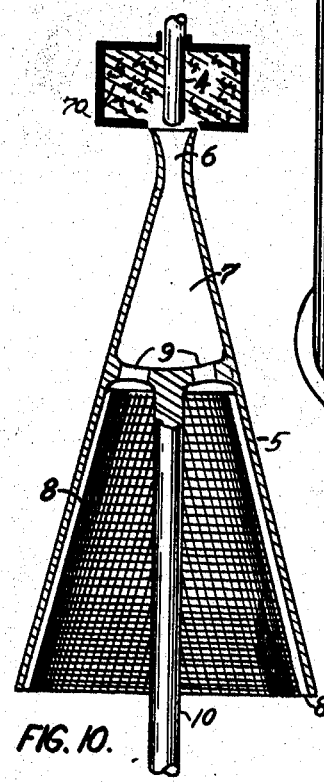
FIG. 10.
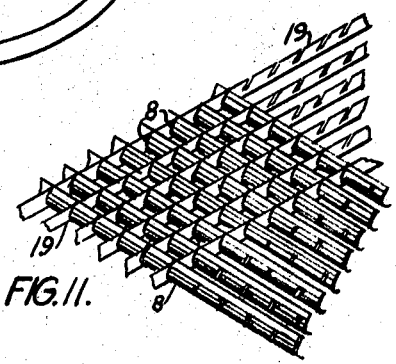
FIG. 11.
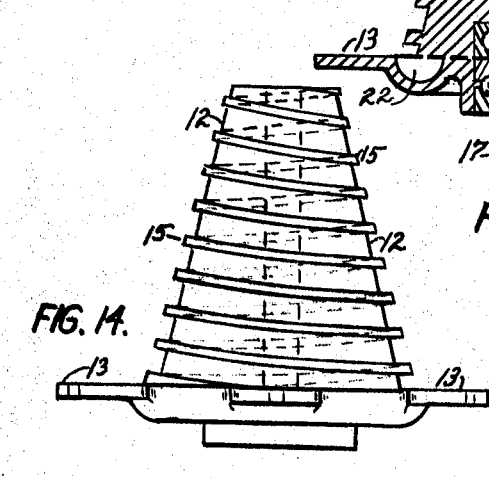
FIG. 12.
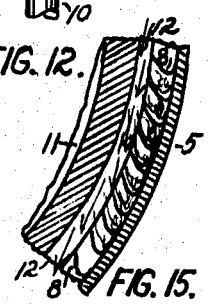
FIG. 15.
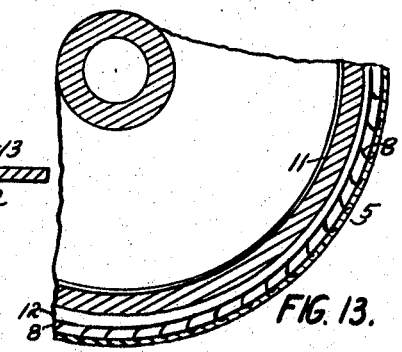
FIG. 13.
FIG. 14.
INVENTOR.
GEORGE C SORENSEN
BY

EXTERNAL COMBUSTION ENGINE

This invention relates to an engine combining internal combustion and external combustion engine in cooperation, also a rotary external combustion engine of novel design utilizing subject matter pertaining to the above exemplification and both contain subject matter pertaining to my application dated Feb. 18, 1969 Ser. No. 800,200. I hope to file this application as a continuation-in-part to the above dated and numbered application.

The efficiency of external and internal combustion engines runs from about 10 percent to 30 percent; they suffer their greatest losses through the exhaust system and cooling system for the internal combustion and exhaust system, condensation in the cylinders, radiation from boiler, plumbing, poor heat exchange from furnace to steam in a steam or external combustion engine.

It is therefore a primary object of this invention to increase efficiency by utilizing the exhaust from an internal combustion engine cylinder to scavenge the spent gases from an adjacent external combustion engine cylinder and charging this cylinder with hot gases to, upon compression, superheat hot water from cooling system of internal combustion engine flashing it to steam pressure thereby providing working energy from the two principle efficiency losses.

It is another object of this invention to capture, condense and filter out the injurious smog-producing compounds from the products of combustion returning the water compounded from combustion of oxygen and hydrogen as makeup water to boiler or cooling system.

It is yet another object to produce an engine requiring a minimum of machine work in its construction.

With the foregoing and other objects in mind I have developed an engine fulfilling these objects by the new and novel arrangement, combination, and construction of parts as hereinafter more fully described and set forth in the claims appended hereto and disclosed in the accompanying drawings forming part hereof. It will be well to state at this point the engine may vary in form, number and kind of expansion chambers without departing from the spirit of the invention.

FIG. 1 is a sectional view illustrating internal as well as external parts in assembled order.

FIG. 2 illustrates the hollow spherical nature of the ball check valves as used in one exemplification.

FIG. 3 illustrates a check valve retainer and cover for water distributor channel.

FIG. 4 is a fragmentary enlarged sectional view of water injection pump illustrating manner of variably admitting pressurized hot water to distributing channel and method of spraying water flashing to steam through one of multiple orifices in a tangential manner imparting a whirling spray to all hot surfaces and areas.

FIG. 5 illustrates assembly of combination separator, water distributing system and variable admission control system.

FIG. 6 illustrates combustion engine side of separator and collecting channel for conducting small stream of cooling water through hottest area to water distributing pump.

FIG. 7 illustrates another embodiment of separator comprising the same water collecting and distributing channel but with one central large passage.

FIG. 8 is a cross section view of separator FIG. 7.

FIG. 9 is an assembly view of another embodiment consisting of all the elements described in my application filed Feb. 18, mentioned in the foregoing, but using a new design rotary engine utilizing the intermingling of products of combustion compressed in a mixing chamber by jet of steam.

FIG. 10 is a cross section of rotary engine showing new and novel manner of combining compression chamber, rotary engine buckets and power shaft into one simple easily machined unit; FIG. 10A shows engine for operation with steam only.

FIG. 11 is a detail showing how the engine buckets are fabricated into a mat from which a sector may be taken and formed into a cone and secured in the engine's conical frustums interior, forming buckets.

FIG. 12 is a cross section of a combination base, power shaft and bearing support and providing a conical frustum member having a groove formed circling and ever increasing in depth as it progresses in a helical manner to base.

FIG. 13 is a fragmentary cross section showing relation of FIG. 10 to FIG. 12.

FIG. 14 is a solid side view showing helical groove formed in conical frustum base.

FIG. 15 is an enlarged fragmentary view showing action of expanding gases on rotary engine buckets.

It will be noticed the lower half of view FIG. 1 is a two-stroke cycle blower charged internal combustion engine comprising cylinder 1, piston 2, crankshaft 3, spark plug 4, and blower 5 which may be fuel charged by carburetor attached to inlet side of blower or by solid injection into the cylinder, either system familiar to the art. The upper half of view FIG. 1 is a similar unit comprising cylinder 6, piston 7, and crankshaft 8 disposed in a cylinder-head-to-cylinder-head arrangement with the two units being secured together with a common cylinder head or separator 9; each unit is geared to the other by mitre gears 10 and shaft 11 in a manner that causes piston 7 to uncover ports 12 about 12° of crankshaft rotation before piston 2 uncovers ports 13 to encourage a rapid imbalance in pressure which causes an easy transfer of products of combustion gas from cylinder 1 to cylinder 6 and also causes a 12° earlier closure of ports 12 thereby capturing most of the hot products of combustion further urged through separator by blower charged incoming fuel-air mixture filling cylinder 1. In beginning operation water may be heated in heat exchanger 71 routed through opened valve 66 pressure pump 27 passage 28 circulated through cooling passages 14 and 15 and by pass pressure relief valve 62 recirculated pipe 63 and pump 27 until engine has reached operating temperature; with hand lever 16 in position indicated in FIG. 5 pump 21 will be inoperative and engine may be operated as gas engine assisting warmup by blower 5 charging cylinder 1 with swirling combustible mixture and both gas engine side and steam engine side are designed with same compression ratio, spark plug 4 firing combustible mixture, expansion in cylinder 1 will cause like timed reciprocable piston 2 and reciprocable piston 7 in cylinder 6 to impart rotary action to crankshafts 3 and 8 through equal pressures communicating readily through check valves 18 or passage 19 according to whether separator 9 or separator 20 be used; when pressure and temperature of circulating water reaches proper state hand lever 16 is moved about axis 17 forcing tapered follower 32 between cam 19 and pump plunger 21 creating an adjustable stroke as cam 19 affects varying thickness of follower 32 determined by operator and demand for steam. At end of piston 7 stroke exhaust ports 12 open creating sudden collapse of pressure in cylinder 6 exhausting into manifold 22 thence into condenser 56 at the same time a new fuel and air mixture is impelling exhaust gas from cylinder 1 through valves 18 or passage 19 into cylinder 6 in a uniflow manner; piston 7 closes ports 12 capturing hot exhaust gas from cylinder 1 and as both pistons approach separator 9 or 20 their respective charge is equally compressed where the temperature of the hot exhaust gas may be raised from admission temperature to thousands of degrees dependent upon compression, and heat of cylinder 1 exhaust, superhot water is sprayed into compression end of cylinder 6 to flash into steam at the same time ignition of the fuel charge in cylinder 1 causing opposing combustion and steam expansions to cooperatively impell their forces to pistons 7 and 2 imparting their thrust through connecting rods 23 and 24 rotatively engaging crankshafts 8 and 3 which are geared to each other as stated above. Cooling water is collected and admitted to pump 21 through hot area passages 25 and 26 and forced by pump plunger 21 through passage 29 steaming through orifices 30 cooling separator 9 or 20. Ball check valves 18 are retained near their seats by retainer 31 which also serves as a channel cover forming passage 29. Ball check valves 18 are provided to prevent preignition from compressed hot gas in steam side of engine, but a stratum of steam admitted between charges serves the same purpose in the event separator 20 be used. Balls 18 made as hollow heat-resistant spheres enabling their light weight to be easily moved from their heat-resistant seats by variation of pressure within cylinder 1 and cylinder 6. Power may be taken from either or both crankshafts in the customary manner. Oxygen and hydrogen, derived from fuel-air mixture upon combustion create water vapor which is condensed from final exhaust in condenser 56 filtered and returned as makeup water to cooling system.

In another embodiment illustrated in FIG. 9 assembly comprises a boiler shell 1, blower assembly 2, heat exchanger coil 3, rigidly supported and appropriately situated diverging nozzle 4, a conical rotary housing engine 5.

FIG. 10 illustrates cross section of conical rotary housing, venturi passage at its vertex, relation of diverging nozzle to venturi, combustion gas filter, integral manner of concentrically arranged power shaft, mixing and compression chamber formed between venturi passage and union of housing passages communicating between compression chamber and hollow conical frustum of lower part of housing and bucket mat arrangement secured to inner surface of conical frustum.

FIG. 11 illustrates manner of fabricating bucket mat from simple members.

FIG. 12 is a cross section of a conical frustum forming core and base for rotary housing FIG. 10 having an aperture concentrically piercing body from minor diameter to major diameter forming bearing supports and passage for aligning power shaft in a concentric rotative manner therethrough; a groove circles the frustum in a helical manner from its minor to its major diameter ever increasing in depth in it progress forming expansion chamber; it includes a base having a channel for collecting exhaust gases and brackets for sealably engaging boiler closure.

FIG. 13 is a fragmentary cross section FIG. 12 showing a fragment of lower rotary housing in its intended relation.

FIG. 14 is a side view of base and frustum showing manner of deepening groove.

FIG. 15 is an enlarged view showing fragmentary relation of rotary housing to base frustum and its bucket and groove relation and how cyclonic rush of expanding gas imparts its tangential force as torque to buckets secured to interior of rotary housing.

It will be noticed groove 12 provides an admission passage at its beginning and an exhaust passage at its ending.

In operation exemplification FIG. 9 boiler shell 1 is pressurized by blower burner 2 steam generated in heat exchanger coil 3 is, upon opening valve 18, permitted to jet through diverging nozzle 4 rigidly secured in focal point of reflected heat into venturi passage 6 draws hot products of combustion gas from boiler shell 1 furnace through filter 70, when dirty gas requires it, and rammed into chamber 7 where it is compressed, intermingled with and superheats steam; the resulting mixture of gases passing through passages 9 and rushes cycloniclike around helical groove expansion chamber 12 and against a mat forming a plurality of buckets secured as a lining in the interior of frustum of rotary conical housing 5. The helical groove is ground and polished permitting unhindered but guided passage of gas mixture. The interior of cone frustum bucket mat is machine ground having the same taper per inch as the exterior machine ground groove crests 15 of base frustum providing very close tolerance between mat buckets 8 and crests 15. The mat buckets are formed by crisscrossing longitudinal members 19 with C-formed members having their concave side cupped into the gas stream as indicated in FIG. 11. Members 19 are secured at each interstice with members 8 and disposed in a concentric manner with conical housing 5. Members 19 are provided to maintain proper attitude of C-formed members 8 in relation to helical gas stream and also to prevent digression of gas stream from its intended passage. Each member 19 forms a ring when secured end to end. The pressurized gas following polished groove 12 speeds in a helical manner in its cyclonic rush continually hurls its tangential energy into pressure against each cupped side and causes a vacuum on each convex side of every bucket. The swirling action of gases constantly spraying each bucket contacts the inner surface of rotary housing 5 causing constant expansion delivering more energy to speed gas in its passage while at the same time cooling rotary housing to an allowable degree. The accumulated thrust energy of each bucket is delivered a constant torque to power shaft 10. Created water vapor from combustion gases is reclaimed from makeup water as described in the foregoing.

I claim:
1. An external combustion engine, comprising:
   a substantially conical rotary housing with a venturi inlet at its apex, an internal compression chamber directly beneath said apex in open communication with said inlet, and an expansion chamber in open communication with said compression chamber internal said housing beneath said compression chamber;
   a substantially conical frustum-shaped stator member mounted concentrically within said expansion chamber, including a helical crest on its outer surface to guide gases entering said expansion chamber into a cyclonic flow pattern;
   a lining secured to the interior surface of said expansion chamber adapted to oppose said cyclonic flow of gases through said expansion chamber; and
   a shaft rotatably mounted axially with said stator member and anchored to said housing so that when gas is introduced through said inlet, said housing is caused to rotate with respect to said stator.

2. An external combustion engine according to claim 1, including a shell member, sealably enclosing said venturi inlet; means for introducing combustion gases to the interior of said shell member; and means for introducing steam to said venturi inlet.

UNITED STATES PATENT OFFICE
CERTIFICATE OF CORRECTION

Patent No. 3,572,037            Dated March 23, 1971

Inventor(s) George C. Sorensen

It is certified that error appears in the above-identified patent and that said Letters Patent are hereby corrected as shown below:

Column 4, line 27, "from" should read -- for --.

Signed and sealed this 7th day of December 1971.

(SEAL)
Attest:

EDWARD M. FLETCHER, JR.           ROBERT GOTTSCHALK
Attesting Officer                       Acting Commissioner of Pate